US011669060B2

United States Patent
Ududec et al.

(10) Patent No.: US 11,669,060 B2
(45) Date of Patent: Jun. 6, 2023

(54) HYBRID MACHINE LEARNING AND SIMULATION BASED SYSTEM FOR FORECASTING IN ELECTRICITY SYSTEMS

(71) Applicant: Invenia Technical Computing Corporation, Winnipeg (CA)

(72) Inventors: Cozmin Ududec, London (GB); Lorenzo Sindoni, Berlin (DE); Eric Perim Martins, Cambridge (GB)

(73) Assignee: Invenia Labs Limited, Cambridge (GB)

( * ) Notice: Subject to any disclaimer, the term of this patent is extended or adjusted under 35 U.S.C. 154(b) by 797 days.

(21) Appl. No.: 16/544,782

(22) Filed: Aug. 19, 2019

(65) Prior Publication Data

US 2021/0055700 A1 Feb. 25, 2021

(51) Int. Cl.

| | |
|---|---|
| ***G05D 3/12*** | (2006.01) |
| ***G05D 5/00*** | (2006.01) |
| ***G05D 9/00*** | (2006.01) |
| ***G05D 11/00*** | (2006.01) |
| ***G05D 17/00*** | (2006.01) |
| ***G05B 13/04*** | (2006.01) |
| ***G06N 20/00*** | (2019.01) |
| ***G06Q 50/06*** | (2012.01) |
| ***H02J 3/00*** | (2006.01) |

(52) U.S. Cl.

CPC ........... *G05B 13/048* (2013.01); *G06N 20/00* (2019.01); *G06Q 50/06* (2013.01); *H02J 3/008* (2013.01); *H02J 3/003* (2020.01); *H02J 2203/20* (2020.01)

(58) Field of Classification Search

CPC ...... G05B 13/048; G06N 20/00; G06Q 50/06; G06Q 10/04; H02J 3/008; H02J 3/003; H02J 2203/20

See application file for complete search history.

(56) References Cited

U.S. PATENT DOCUMENTS

| | | | | |
|---|---|---|---|---|
| 10,152,683 | B2 * | 12/2018 | Chen | G06Q 10/00 |
| 2012/0323389 | A1 | 12/2012 | Shelton et al. | |
| 2013/0238530 | A1 | 9/2013 | Ghosh et al. | |
| 2013/0245847 | A1 * | 9/2013 | Steven | G06Q 10/00 700/291 |
| 2014/0074670 | A1 | 3/2014 | Garrity et al. | |
| 2014/0277797 | A1 * | 9/2014 | Mokhtari | G06Q 30/0202 700/291 |
| 2016/0378894 | A1 | 12/2016 | Yoon | |

FOREIGN PATENT DOCUMENTS

| | | | |
|---|---|---|---|
| WO | WO 2013/166510 | A1 | 11/2013 |
| WO | WO 2016/079419 | A1 | 5/2016 |

OTHER PUBLICATIONS

PCT International Search Report and Witten Opinion, PCT Application No. PCT/IB2020/000675, dated Oct. 6, 2020, 14 pages.

* cited by examiner

*Primary Examiner* — Zhipeng Wang
(74) *Attorney, Agent, or Firm* — Fenwick & West LLP

(57) ABSTRACT

A hybrid machine-learning and simulation-based system provides forecasting for an energy system. The system predicts day-ahead and real-time supply and demand, and prices of energy, and generates inputs to an optimization algorithm performed by an Independent System Operator (ISO) that affects behavior of electricity generators and electricity consumers to improve the economic efficiency of electricity grids, and reduce harmful emissions.

20 Claims, 4 Drawing Sheets

HYBRID MACHINE LEARNING AND SIMULATION BASED SYSTEM FOR FORECASTING IN ELECTRICITY SYSTEMS

BACKGROUND

Technical Field

This application relates generally to a method for predicting conditions associated with an electric grid to improve planning and efficiency of energy generation and transmission.

Description of the Related Art

The current United States electric grid includes close to 2,000 utilities, over 300,000 miles of transmission lines, and 7,200 power generating facilities with a generation capacity of at least one megawatt. The electric grid is split into various regions, some of which are operated by non-profit organizations called Independent System Operators (ISOs).

The ISOs (also called Regional Transmission Organizations (RTOs) or Transmission System Operators (TSOs)) coordinate, control, and monitor the operation of the electric grid and its many participants. ISOs act as a neutral third party without a financial interest in decision making, and are guided instead by reliability, operational, regulatory, and efficiency considerations. They provide non-discriminatory access to transmission and generation providers, facilitate competition among wholesale suppliers to improve transmission services and provide efficient wholesale electricity access to utilities. Across large regions, the ISOs send generation and reactive demand signals, schedule the use of transmission lines, and manage the interconnection of new generators. They also monitor the grid to ensure fairness and neutrality between all participants.

Unlike other goods, electricity cannot currently be stored efficiently. It flows through the electric grid according to the laws of electromagnetism rather than directly from a producer to a consumer. Each piece of equipment in the electric grid has various physical limits on what can be produced, transmitted, and consumed at that location. These limits can result in what is often called "transmission congestion", and this can cause an electric grid to become segmented, meaning that some generators cannot compete (economically or physically) to provide electricity to certain locations. This implies that the physical location of generation and consumption and the structure of the transmission network should be taken into account in production, and for economically efficient pricing. In addition, reliability is generally considered more important than price efficiency: at any moment of time, supply and demand must match almost exactly to avoid blackouts or other problems.

To be a participant in the electric grid via the wholesale market, one does not have to own any generation or serve any customers. The wholesale market includes suppliers and resellers that are middlemen between utilities and end users or small generators, independent power producers (IPPs) not affiliated with a utility, financial participants, and load serving entities. All these participants interact with each other via the ISO's electronic platform.

Optimal Power Flow (OPF) is at the heart of efficient and reliable ISO operations. Because of the relevance of the configuration of the electric grid and the locations of generation and consumption as discussed above, the ISOs operate according to a spatial and temporal pricing mechanism. Currently all ISO's in the United States use variants of the Locational Marginal Pricing (LMP) system, which sets potentially different prices at hundreds or thousands of important locations (busses, or nodes) throughout the electric grid. These prices are part of the solution to an OPF problem, and represent the change in optimized total system costs as a result of a small increase in the amount of power consumed at a specific location and time. LMPs are generally split into three components: a Marginal Energy Cost (MEC) which represents the cost of producing the next unit of power, a Marginal Congestion Cost (MCC) which represents the cost of changing generation sources in order to get extra power to a consumer given all the other power flowing through the system at the time (rather like the sending of a package from a different fulfillment center due to traffic congestion), and a Marginal Loss Cost (MLC) which represents the cost of thermal losses in the grid. ISOs solve the OPF problem in some form or approximation many times per day, as often as every 5 minutes. Advances in computing power and solution algorithms have led to better modeling of constraints and removing unnecessary limits and approximations. However, there are still no robust and fast solution techniques for the full and exact alternating current problem with all relevant constraints modeled accurately.

Historically, ISOs relied exclusively on a real-time grid optimization system, meaning that wholesale producers and consumers would send their generation offers and consumption requirements typically every 5-15 minutes. The ISO would use this real-time information to solve the OPF problem and determine price signals and dispatch generators. Relying only on such a real-time system has two main shortcomings. First, planning and optimization is extremely difficult. Some generators need to know well in advance how much they need to generate so that they can slowly increase production to the required level. Second, price signals determined every few minutes according to the real-time grid condition can be extremely volatile.

In order to mitigate the above-described issues, ISOs introduced an approximate grid optimization which is run the day before a given target day. This is often called the day-ahead planning process. For this preliminary step, the ISO receives generator offers as well as demand curve estimates from load serving entities for each hour of the following day. The ISO then takes their best estimates of the configuration of the transmission grid during the target day, as well as other relevant forecasts, and solves the OPF problem for each of the 24 hours of the target day. Wholesale market participants are notified of the resulting estimated schedules and LMPs in the afternoon of the day before the energy is scheduled to be delivered. These day-ahead schedules and LMPs constitute a plan by the ISO given the best information available at the time, and further represent a financial commitment by generators and wholesale consumers.

Starting on the first hour of the relevant target day, the ISO then runs OPF (usually every 5 minutes) using real-time conditions, and determines the actual physical output of generators necessary to serve real-time demand at all locations in the electric grid. Suppliers are allowed to change their hourly generation schedules between the day ahead and real-time systems. However, any resulting difference between the day-ahead planned production and real-time physical production schedules is accounted for financially by using the difference between the day-ahead LMP and the real-time LMP at the relevant grid location. These extra costs are ultimately paid by consumers via residential and industrial rates, and represent an economic inefficiency of the system stemming from inaccurate forecasts in the day-ahead grid optimization.

A further problem with this dual optimization setup is that producers and load serving entities can improve their own outcomes to the detriment of the system by delaying production or consumption commitments until the real-time grid optimizations are run. For example, if a generator expects the LMPs resulting from the real-time OPF to be higher than those resulting from the day-ahead, they will simply not commit—some of—their power in the day-ahead. If enough generators share these expectations, the ISO will find that the day-ahead optimization does not have nearly enough committed power to serve all expected consumption in real-time.

Once these issues were widely recognized, they were dealt with in two related ways. First, ISOs introduced a new tool which allow physical producers and consumers to explicitly hedge any expected price differences between the day-ahead and real-time system optimizations, while still committing their best estimates of production and consumption schedules fully in the day-ahead planning process. Second, ISOs began allowing participants in the day-ahead planning process which do not own any physical generation plants or serve physical power to any customers. These participants are often called virtual participants, or virtual utilities. With respect to the day-ahead grid optimization, virtual participants input supply or demand offers to the ISO just like physical participants, but make no commitments to produce or consume physical electricity in real-time. A supply commitment by a virtual participant in the day-ahead optimization with some resulting day-ahead LMP creates a financial obligation to effectively buy back the same amount of virtual power as a price taker given the LMPs output by the real-time optimization. This results in a net settlement which is the difference between the day-ahead and real-time LMPs at a specific location and time, times the number of MWh committed in the day-ahead planning process. The benefits of allowing such virtual participants are improved planning, scheduling, price efficiency, as well as mitigation of possible market power by large utilities. If the forecasts of a virtual utility for grid conditions, generation and demand, are more accurate than the ISOs or other physical participants, the resulting day-ahead optimization outputs will more closely match the subsequent real-time optimization outputs, thus creating a more realistic and optimal production schedule in the day-ahead, allowing more economic sources of generation, flow and use of power to be selected, and this will be transparently reflected in convergence between day-ahead and real-time LMPs. As a result of improving the efficiency of the electric grid, participants may also have the benefit of reducing $CO_2$ and particulate emissions in to the environment. However, the benefits provided by virtual participants can only be fully realized if the virtual participants are able to accurately forecast the grid conditions, demand and generation from other participants, and to bid in the day-ahead optimization accordingly.

SUMMARY

A method generates a control input to improve efficiency of an electrical power grid. A bid generation module of a virtual participant obtains a plurality of models for modeling historical data associated with the operation of the electrical power grid. The bid generation module generates, based on the plurality of models, a plurality of input probability distributions representing predicted inputs to a complex system optimization executed by an Independent System Operator (ISO) for scheduling power production and transmission across the electric power grid according to day-ahead and real-time schedules. The bid generation module simulates execution of the complex system optimization for each of the multiple input probability distributions to generate respective output probability distributions of predicted differences (deltas) between the day-ahead and real-time schedules and prices as predicted to be determined by the ISO. The bid generation module determines a control input for submission to the ISO representing nodal corrections to supply and demand that maximize scheduling efficiency based on the probability distributions of the predicted deltas; The bid generation module then submits the control input to the optimization system of the ISO, wherein the ISO controls production schedules of generators in the electric grid based in part on the control input.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
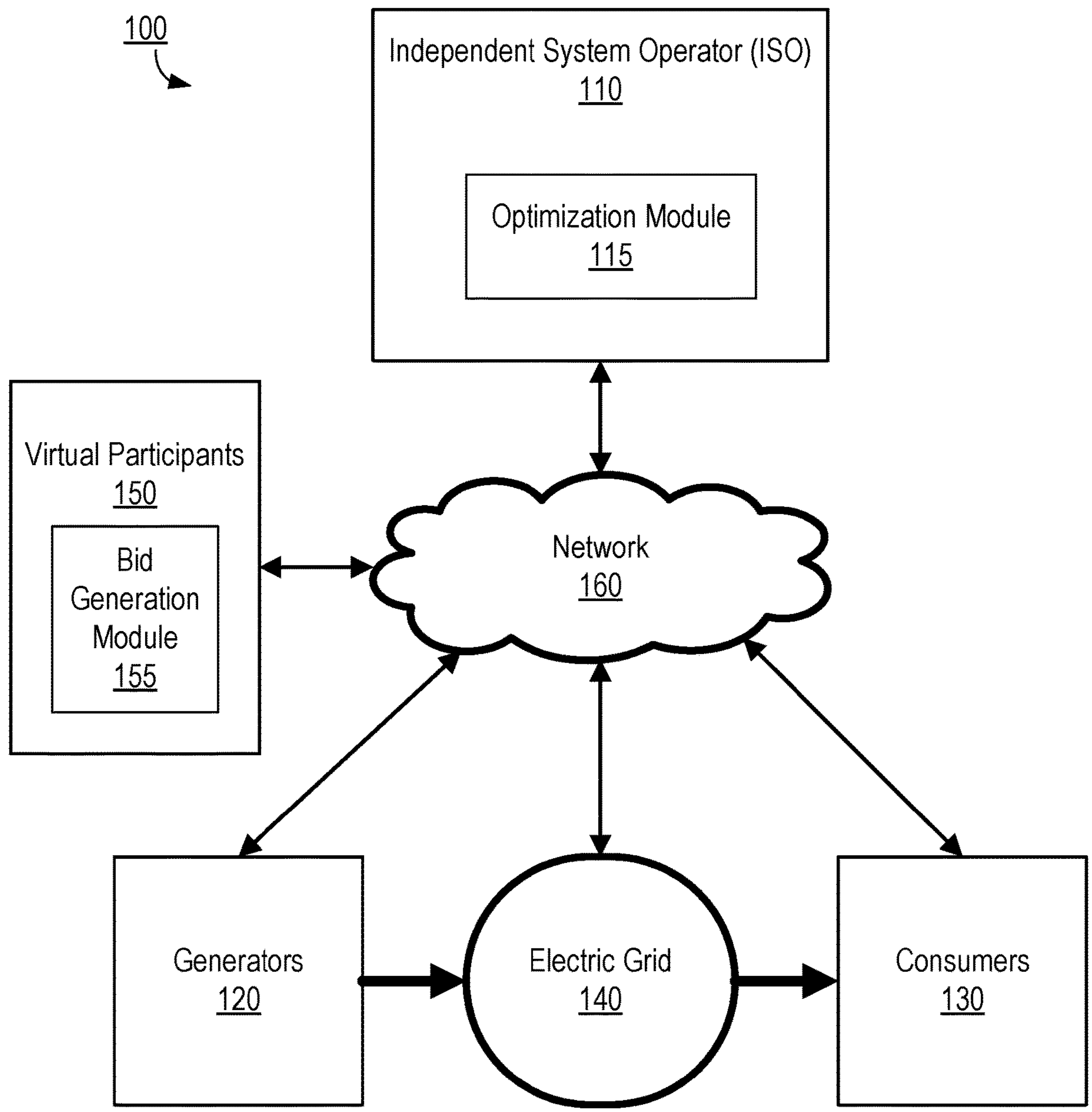
FIG. 1 illustrates an example embodiment of an energy system.

FIG. 1 illustrates an example embodiment of an energy system 100. The energy system 100 comprises an electric grid 140 that delivers electrical power from generators 120 to consumers 130. The energy system also includes an ISO 110 and one or more virtual participants 150. A network 160 enables communication between the ISO 110, the virtual participants 150, and computer systems associated with the generators 120, the consumers 130, and the electric grid 140. In alternative embodiments, the energy system 100 may include different or additional components.

The electric grid 140 comprises the physical infrastructure for distributing electrical power from the generators 120 to the consumers 130. The electric grid 140 may comprise, for example, high-voltage transmission lines, substations, distribution lines, associated computer systems, and other components used for distributing electricity from generators 120 to consumers 130.

The ISO 110 coordinates, controls, and monitors the operation of the electric grid 140, the generators 120, the consumers 130, and the virtual participants 150. Each day, the ISO 110 obtains the day-ahead bids from the generators 120, consumers 130, and virtual participants 150 and information about the conditions of the electric grid 140. The ISO 110 includes an optimization module 115 that executes a day-ahead optimization that generates the day-ahead LMPs and production schedules, and distributes this information to the generators 120, consumers 130, and virtual participants 150. The optimization module 115 also stores the solution to the day-ahead optimization.

In a separate process from the day-ahead processing, the optimization module 115 furthermore periodically obtains the real-time bids from the generators 120 only, and information about the conditions of the electric grid 140. The optimization module 115 periodically executes a real-time optimization that generates the real-time LMPs and production schedules and distributes this information to the generators 120, consumers 130, and virtual participants 150. The model of the electric grid 140 and the optimization process performed by the optimization module 115 may be different for the day-ahead and real-time processing as will be described in further detail below.

In an embodiment, the optimization module 115 is implemented as one or more processors and a non-transitory computer-readable storage medium that stores instructions that when executed by the one or more processors causes the one or more processors to carry out the functions attributed to the optimization module 115 described herein. An example embodiment of an optimization module 115 is described in further detail below with respect to FIG. 2.

The generators 120 comprise any entities and associated systems for generating electric power supplied to the electric grid 140. The generators 120 may produce electric power using various power production technologies such as, for example, burning fossil fuels, solar power, wind power, hydropower, thermal power, atomic energy, or any other power production technologies. To participate in the wholesale energy market, the generators 120 submit day-ahead bids to the ISO 110 representing blocks of minimum prices that the generator 120 will accept to commit to supplying a specified number of units of energy at a particular location (i.e., node) on the electric grid 140 on the following day. The generators 120 furthermore submit real-time bids to the ISO 110 representing blocks of minimum prices that the generator 120 will accept to commit to supplying a specified number of units of energy at a particular location on the electric grid 140 in substantially real-time.

The consumers 130 comprise any entities and associated systems for consuming electrical power drawn from the electric grid 140. The consumers 130 may comprise, for example, electric utility services that purchase electrical power and distribute the electric power to individual households and businesses. To participate in the wholesale energy market, the consumers 130 submit day-ahead bids to the ISO 110 representing a maximum price offered by the consumer 130 to commit to buying a specified number of units of energy at a specified location on the electric grid 140 on the following day. The consumers 120 furthermore submit real-time bids to the ISO 110 representing the substantially real-time maximum price offered by the consumer 130 to commit to buying a specified number of units of energy at a specified location on the electric grid 140 in the immediate future.

The virtual participants 150 comprise entities and associated systems that virtually participate in the wholesale energy market without actually supplying or consuming physical energy. The virtual participant 150 executes a bid generation module 155 that determines and submits day-ahead bids to the ISO 110 similar to the generators 120 and the consumers 130. A virtual participant 150 may submit a supply bid representing a minimum price offered by the virtual participant 150 in the day-ahead market for a corresponding number of units of energy at a particular location that the virtual participant 150 commits to buy back the following day at the real-time LMP. Alternatively, the virtual participant 150 may submit a demand bid representing a maximum price offered by the virtual participant 150 in the day-ahead market for a corresponding number of units of energy at a particular location that the virtual participant 150 commits to sell back the following day at the real-time LMP. Thus, between the day-ahead market and the real-time market, the virtual participant 150 buys and sells an equal number of units of energy at a particular location, thereby canceling out any net energy. The bid generation module 155 generally seeks to predict both the day-ahead LMPs, and the real-time LMPs in order to submit bids. The activities of the virtual participant 150 results in adjustments in the behaviors of the generators 120 and the consumers 130 in response to perceived changes in supply and demand, and these changes have a real effect in improving the overall economic efficiency of the electric grid 140. In an embodiment, the bid generation module 155 is implemented as one or more processors and a non-transitory computer-readable storage medium that stores instructions that when executed by the one or more processors causes the one or more processors to carry out the functions attributed to the bid generation module 155 described herein. An example embodiment of a bid generation module 155 is described in further detail below with respect to FIG. 3.

Figure 2:
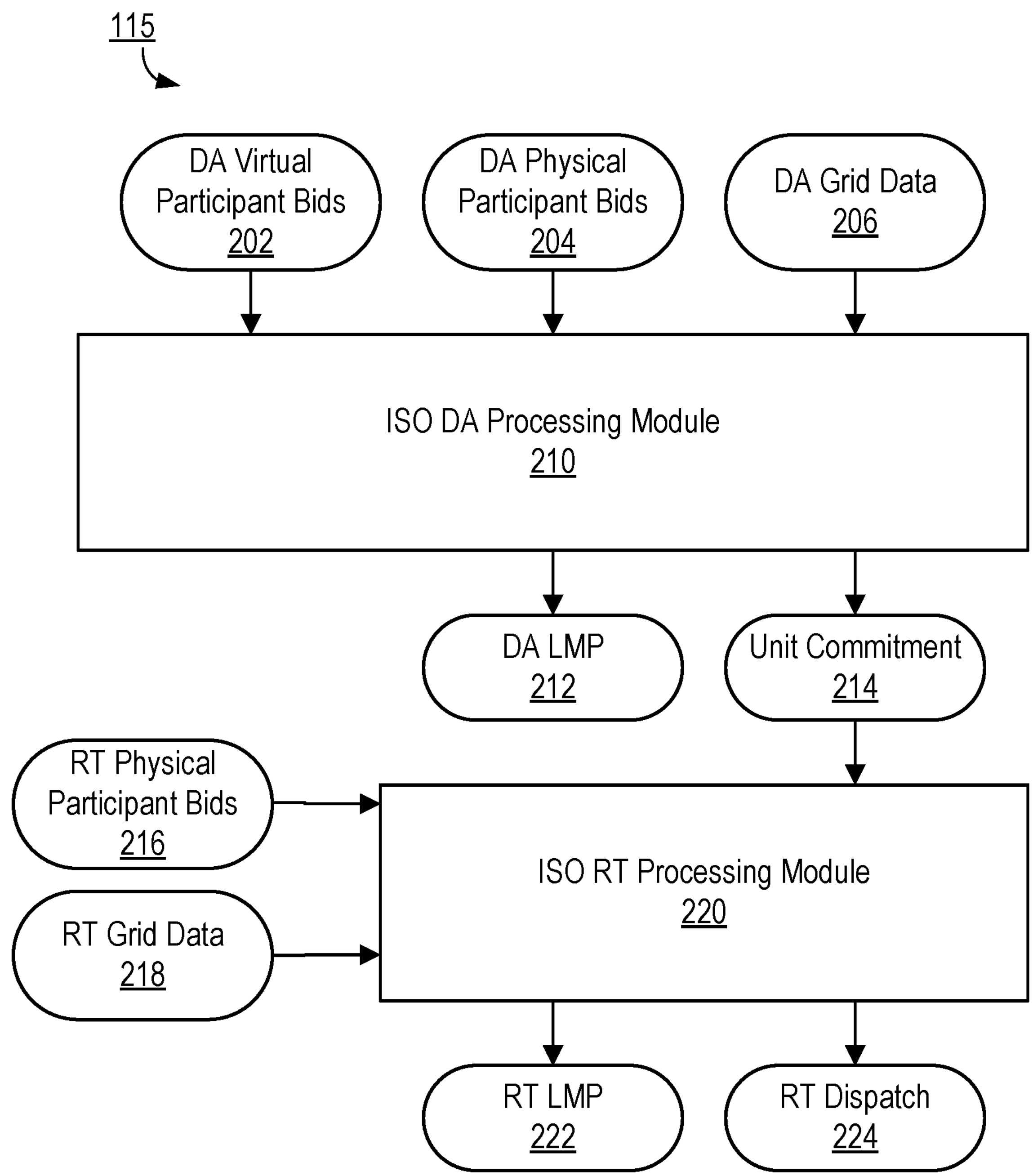
FIG. 2 illustrates an example embodiment of an optimization module executed by an ISO.

FIG. 2 illustrates an example embodiment of an optimization module 115 executed by an ISO 110. The optimization module 115 comprises a day-ahead processing module 210 and a real-time processing module 220. Alternative embodiments may include different or additional modules.

The day-ahead processing module 210 receives virtual participant day-ahead bids 202 (e.g., supply or demand bids), day-ahead physical participant bids 204 (demand bids from consumers 130 or supply bids from generators 120), and day-ahead grid data 206 representing predicted characteristics of the electric grid 140 relevant to estimating supply and demand for the following day. These predicted characteristics can include weather conditions and scheduled maintenance of transmission lines and generators. The day-ahead processing module 210 performs an optimization algorithm (Optimal Power Flow) to generate a day-ahead scheduling including a set of day-ahead LMPs 212 for the day-ahead market and unit commitments 214 representing an estimated supply of energy available to consumers 130 at each location (node) of the electric grid 140. The optimization performed by the ISO 110 aims at maximizing social welfare. In this context, social welfare is defined as low energy cost and high system reliability. The optimization algorithm minimizes the total cost of generation and transmission of energy, constrained by conditions that ensure the safe operation of the entire electric grid 140. The safe operation of the electric grid 140 requires that no transmission line transport an electric current over its limit, that generators 120 have the ability to respond to demand and supply fluctuations in time, and that demand is matched with supply.

The real-time processing module 220 obtains the day-ahead unit commitments 214 calculated on the prior day from the day-ahead market and obtains real-time physical participant bids 216 (demand signals from consumers 130 or supply bids from generators 120) and real-time grid data 218. The real-time processing module 220 perform an optimization algorithm to generate a set of real-time LMPs 222 for the real-time market and real-time dispatch data 224 representing the instructions to individual generators 120 as to how much energy should be produced and to substations representing as to how to distribute the generated power. Different ISOs 110 can run the real-time module 220 in different time intervals, which are typically of 5-15 minute intervals.

Figure 3:
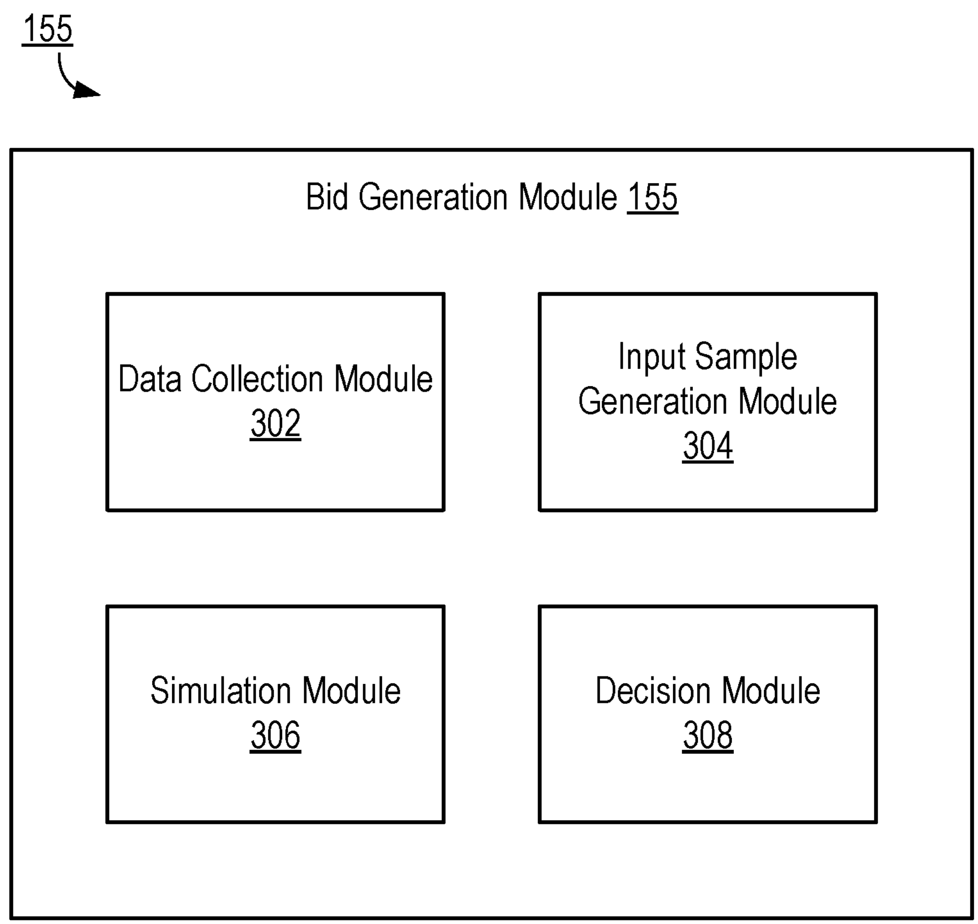
FIG. 3 illustrates an example embodiment of a bid generation module executed by a virtual participant.

FIG. 3 illustrates an example embodiment of a bid generation module 155 executed by a virtual participant 150 to generate the virtual participant day-ahead bids. The bid generation module 155 comprises a data collection module 302, an input sample generation module 304, a simulation module 306, and a decision module 308. Alternative embodiments of the bid generation module 155 may include different or additional components.

The data collection module 302 collects historical data relating to operation of the energy system 100 and its associated markets. The data collection module 302 may obtain the historical data from various sources. For example, grid topology and data relating to load and generation including historical bids from physical and virtual participants may be obtained from the ISO 110. Weather data may be obtained from a weather reporting service (e.g., a NOAA server). Population information may be obtained from census data available from various census data servers via the network 160. Fuel prices, heat rates, emissions, and other generation data may be obtained from an EIA server.

The input sample generation module 304 generates input samples from models trained on the collected historical data. An input sample is drawn from a sequence of predicted probability distributions over a sequence of consecutive timestamps that represent how a particular condition is predicted to change over a period of time. Examples of conditions that can be represented by an input sample include: load, generation, grid topology, grid outages, weather, or other conditions that affect the electric grid 140 and may influence supply and demand at locations in the grid 140.

In an embodiment, the input sample generation module 304 obtains a plurality of models for modeling the historical data and performs a conversion of the plurality of models to a set of executable instructions. The plurality of models combines empirical and machine-learned models. Empirical models are generated based on heuristics and represent scenarios of interest, providing full control over the inputs. An example empirical model would be that in which the total energy demand is a linear function of the temperature, plus random noise. Machine-learned models are learned from historical data using a plurality of techniques and aim to produce accurate and well calibrated probability distributions over future data (forecasts) or accurate point forecasts. Techniques that can be used to generate machine-learned models include Neural Networks and Gaussian Processes, among others. The executable instructions may be translated into a set of computation graphs, which may be executed in parallel to obtain the plurality of input probability distributions. Each computation graph represents a set of base inputs to a computation and all the transformation steps of the computation, to output probability distributions. As an example, a model can use hour of the day (H) and temperature (T) to forecast electricity demand (D). A simple computation graph could start from the (deterministic) hour of the day (H), transform it via a quadratic function ($T=a*(H-h\_0)^2+n\_1$) that peaks at an hour (h_0) and includes noise (n_1) in order to obtain the temperature (T). In this equation a, h_0, and n_1 are free parameters to be learned from historical data, via for example a process such as Maximum Likelihood Estimation. Then T is further transformed via a different quadratic function ($D=b*(T-t\_0)^2+n\_2$) that has a minimum at t_0 degrees and also adds noise n_2 in order to obtain the electricity demand (D). As above, b, t_0, and n_2 are free parameters to be learned from historical data. This forecast for D can, then, be used as input to the simulation module 306.

The simulation module 306 executes a set of simulations on the input samples to generate a set of predictions for the day-ahead and real-time LMPs. Each simulation, given an input sample, may execute an optimization algorithm that approximates the day-ahead or real-time optimization algorithms performed by the ISO 110 to make predictions about the day-ahead and real-time schedules that will be computed by the ISO 110. Each simulation may execute using a different simulation model and/or a different subset of the input samples to make a prediction about the day-ahead or real-time LMPs. In an embodiment, the simulation module 306 outputs probability distributions of deltas representing differences between the day-ahead LMPs and the real-time LMPs for different location in the electric grid 140.

In an alternative embodiment, instead of directly simulating or approximating the optimization algorithm performed by the ISO 110, the simulation module 306 may instead execute a surrogate model that represents a relationship between inputs and outputs of the optimization executed by the ISO 110. A surrogate model replaces the complicated optimization module 115 with a simpler algorithm that is able to produce similar mapping between inputs and outputs, either at a smaller computational cost or with less detailed inputs needed. Surrogate models are built using machine-learning techniques, such as neural networks. Neural networks are universal approximators, in that they can approximate any function mapping a given set of inputs to outputs, if built with the necessary complexity, and trained appropriately on a sufficiently large dataset. The optimization module 115 represents a complex function that takes as inputs day-ahead virtual bids 202 and physical 204 bids, real-time physical bids 216 and day-ahead 206 and real-time 218 grid data, mapping outputs which are real-time LMPs 222. This function can be learned by machine-learning models.

The bid generation module 308 obtains the probability distributions of deltas from the simulation module 306 and executes a decision making process to determine bids to be submitted by the virtual participant 150 into the day-ahead market. Generally, if the simulations predict negative deltas (i.e., the real-time LMPs will be higher than the day-ahead LMPs), this is indicative of a prediction that demand will be higher than suggested by the day-ahead market. To compensate, the virtual participant 150 may submit demand bids in the day-ahead market that represent a financial commitment to sell back in the real-time market at the resulting real-time LMPs. A result of the demand bids from the virtual participant 150 is to raise the day-ahead LMPs, thereby better reflecting the predicted higher demand. This in turn encourages generators 120 to offer to supply more energy and encourages consumers 130 to cut back their intended use of energy, to better balance the supply and demand. Alternatively, if the simulations predict positive deltas (i.e., the real-time LMPs will be lower than suggested by the day-ahead LMPs), this is indicative of a prediction that demand will be lower than suggested by the day-ahead market. In this case, the virtual participant 150 may submit supply bids in the day-ahead market for units of energy that represent a financial commitment to buy back in the real-time market at the real-time LMPs. A result of the supply bids from the virtual participant 150 is to lower the day-ahead LMPs, thereby better reflecting the predicted lower demand in the real-time market. This in turn encourages generators 120 to lower their unit commitments to supply less energy in the day-ahead market to better balance the supply and demand.

If predictions of the virtual participant 150 are accurate, this results in a reduction in the magnitude of the deltas between the day-ahead and the real-time LMPs. This in turn enables supply and demand to be better balanced and predictable, thereby improving economic efficiency of the electric grid 140.

Figure 4:
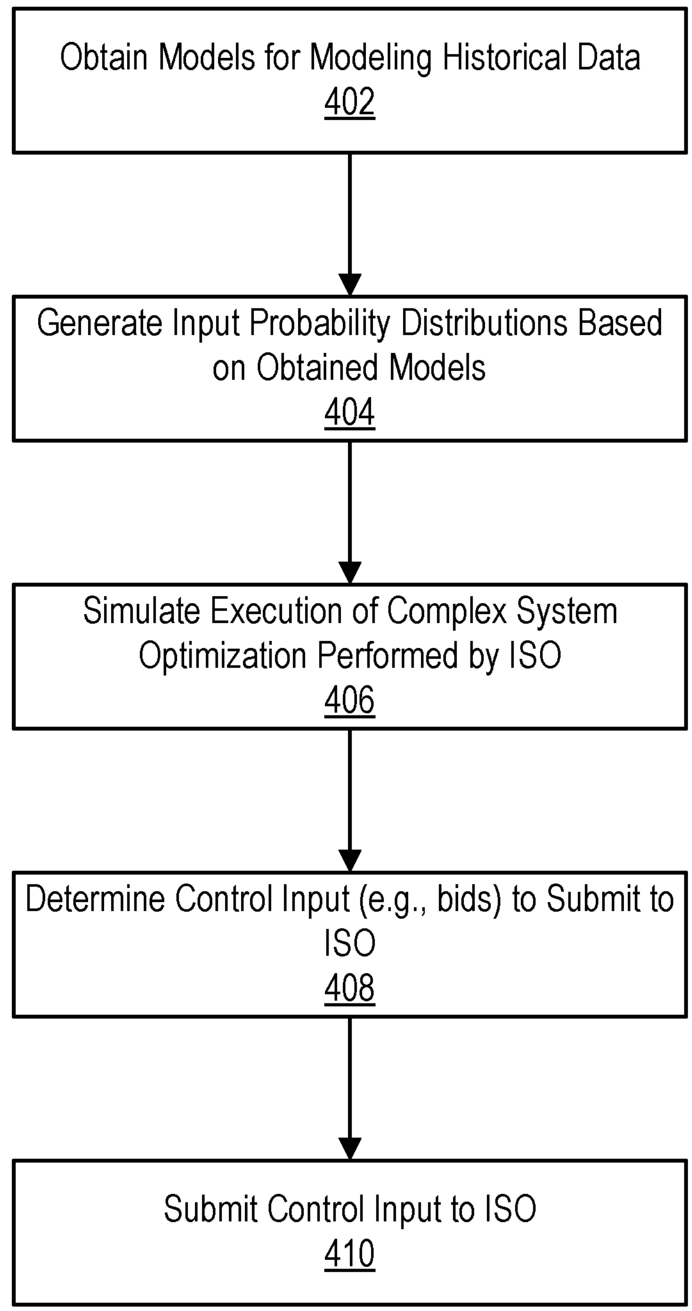
FIG. 4 illustrates an example embodiment of a process for generating supply or demand bids from a virtual participant.

FIG. 4 is a flowchart illustrating an example embodiment of a process executed by a bid generation module 115 of a virtual participant 150 to generate bids to an ISO 110 that operate to improve economic efficiency of the energy system 100. The bid generation module 115 obtains 402 a plurality of models for modeling historical data associated with the operation of the electric grid 140. The bid generation module 115 generates bids 404 based on the plurality of models, a plurality of input probability distributions representing predicted inputs to a complex system optimization executed by an ISO 110 for scheduling power production and transmission across the electric grid 140 according to day-ahead and real-time generation schedules and day-ahead and real-time LMPs. The bid generation module 115 simulates 406 execution of the complex system optimization for each of the multiple input probability distributions to generate respective output probability distributions of predicted deltas between the day-ahead and real-time LMPs as predicted to be determined by the ISO 110. The bid generation module 115 then determines 408 a control input (e.g., one or more day-ahead bids) for submission to the ISO representing nodal corrections to supply and demand that maximize scheduling efficiency based on the probability distributions of the predicted deltas. The bid generation module 115 submits 410 the control input to the optimization system of the ISO 110, which affects how the ISO 110 controls production schedules of generators 120 based in part on the control input.

Embodiments described herein can include other and/or different modules. In addition, the functionality attributed to the modules can be performed by other or different modules in other embodiments.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description represent the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method for generating a control input to improve efficiency of an electrical power grid, the method comprising:

obtaining a plurality of models for modeling historical data associated with the operation of the electrical power grid, wherein each model comprises a neural network and is trained to fit the neural network to historical data that includes one or more input samples and a metric describing operation of the electrical power grid;

generating, based on the plurality of models, a plurality of input probability distributions representing predicted inputs to a complex system optimization executed by an Independent System Operator (ISO) for scheduling power production and transmission across the electrical power grid according to day-ahead and real-time schedules;

simulating execution of the complex system optimization for each of the multiple input probability distributions to generate respective output probability distributions of predicted deltas between the day-ahead and real-time schedules as predicted to be determined by the ISO;

determining a control input for submission to the ISO representing nodal corrections to supply and demand that maximize scheduling efficiency based on the probability distributions of the predicted deltas; and submitting the control input to the optimization system of the ISO, wherein the ISO controls production schedules of generators in the electric grid based in part on the control input.

2. The method of claim 1, wherein generating the plurality of input probability distributions comprises:

performing a conversion of the plurality of models to a set of executable instructions;

translating the set of executable instructions to a set of computation graphs; and executing the set of computation graphs to obtain the plurality of input probability distributions.

3. The method of claim 2, wherein executing the set of computation graphs comprises executing the set of computation graphs in parallel.

4. The method of claim 1, wherein simulating the execution of the complex system optimization comprises:

executing an optimization algorithm approximating the complex system optimization executed by the ISO.

5. The method of claim 1, wherein simulating the execution of the complex system optimization comprises:

executing a surrogate model modeling a relationship between inputs and outputs of the complex system optimization executed by the ISO.

6. The method of claim 1, wherein the control inputs comprise day-ahead bids to the ISO from a virtual participant.

7. The method of claim 1, wherein the day-ahead and real-time schedules comprise day-ahead location marginal pricings (LMPs) and real-time LMPs respectively.

8. A non-transitory computer-readable storage medium storing instructions for generating a control input to improve efficiency of an electrical power grid, the instructions when executed by one or more processors causing the one or more processors to performs steps including:

obtaining a plurality of models for modeling historical data associated with the operation of the electrical power grid, wherein each model comprises a neural network and is trained to fit the neural network to historical data that includes one or more input samples and a metric describing operation of the electrical power grid;

generating, based on the plurality of models, a plurality of input probability distributions representing predicted inputs to a complex system optimization executed by an Independent System Operator (ISO) for scheduling power production and transmission across the electrical power grid according to day-ahead and real-time schedules;

simulating execution of the complex system optimization for each of the multiple input probability distributions to generate respective output probability distributions of predicted deltas between the day-ahead and real-time schedules as predicted to be determined by the ISO;

determining a control input for submission to the ISO representing nodal corrections to supply and demand that maximize scheduling efficiency based on the probability distributions of the predicted deltas; and submitting the control input to the optimization system of the ISO, wherein the ISO controls production schedules of generators in the electric grid based in part on the control input.

9. The non-transitory computer-readable storage medium of claim 8, wherein generating the plurality of input probability distributions comprises:

performing a conversion of the plurality of models to a set of executable instructions;

translating the set of executable instructions to a set of computation graphs; and executing the set of computation graphs to obtain the plurality of input probability distributions.

10. The non-transitory computer-readable storage medium of claim 9, wherein executing the set of computation graphs comprises executing the set of computation graphs in parallel.

11. The non-transitory computer-readable storage medium of claim 8, wherein simulating the execution of the complex system optimization comprises:

executing an optimization algorithm approximating the complex system optimization executed by the ISO.

12. The non-transitory computer-readable storage medium of claim 8, wherein simulating the execution of the complex system optimization comprises:

executing a surrogate model modeling a relationship between inputs and outputs of the complex system optimization executed by the ISO.

13. The non-transitory computer-readable storage medium of claim 8, wherein the control inputs comprise day-ahead bids to the ISO from a virtual participant.

14. The non-transitory computer-readable storage medium of claim 8, wherein the day-ahead and real-time schedules comprise day-ahead location marginal pricings (LMPs) and real-time LMPs respectively.

15. A computer system for generating a control input to improve efficiency of an electrical power grid, the computer system comprising:

one or more processors; and a non-transitory computer-readable storage medium storing instructions that when executed by the one or more processors cause the one or more processors to performs steps including:

obtaining a plurality of models for modeling historical data associated with the operation of the electrical power grid, wherein each model comprises a neural network and is trained to fit the neural network to historical data that includes one or more input samples and a metric describing operation of the electrical power grid;

generating, based on the plurality of models, a plurality of input probability distributions representing predicted inputs to a complex system optimization executed by an Independent System Operator (ISO) for scheduling power production and transmission across the electrical power grid according to day-ahead and real-time schedules;

simulating execution of the complex system optimization for each of the multiple input probability distributions to generate respective output probability distributions of predicted deltas between the day-ahead and real-time schedules as predicted to be determined by the ISO;

determining a control input for submission to the ISO representing nodal corrections to supply and demand that maximize scheduling efficiency based on the probability distributions of the predicted deltas; and submitting the control input to the optimization system of the ISO, wherein the ISO controls production schedules of generators in the electric grid based in part on the control input.

16. The computer system of claim 15, wherein generating the plurality of input probability distributions comprises:

performing a conversion of the plurality of models to a set of executable instructions;

translating the set of executable instructions to a set of computation graphs; and executing the set of computation graphs to obtain the plurality of input probability distributions.

17. The computer system of claim 16, wherein executing the set of computation graphs comprises executing the set of computation graphs in parallel.

18. The computer system of claim 15, wherein simulating the execution of the complex system optimization comprises:

executing an optimization algorithm approximating the complex system optimization executed by the ISO.

19. The computer system of claim 15, wherein simulating the execution of the complex system optimization comprises:

executing a surrogate model modeling a relationship between inputs and outputs of the complex system optimization executed by the ISO.

20. The computer system of claim 15, wherein the control inputs comprise day-ahead bids to the ISO from a virtual participant.

* * * * *